US012621643B1

(12) United States Patent
Smith et al.

(10) Patent No.: US 12,621,643 B1
(45) Date of Patent: May 5, 2026

(54) COMMUNICATIONS SYSTEM FOR DISASTER CONDITIONS

(71) Applicant: UIPCO, LLC, San Antonio, TX (US)

(72) Inventors: Joshua Darius Smith, Dallas, TX (US); Justin Royell Nash, Little Elm, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 308 days.

(21) Appl. No.: 18/362,527

(22) Filed: Jul. 31, 2023

(51) Int. Cl.
*H04W 4/90* (2018.01)
(52) U.S. Cl.
CPC ..................................... *H04W 4/90* (2018.02)
(58) Field of Classification Search
CPC ....................................................... H04W 4/90
USPC ....................................................... 455/404.1
See application file for complete search history.

(56) References Cited

U.S. PATENT DOCUMENTS

| | | | |
|---|---|---|---|
| 2011/0011324 A1* | 1/2011 | Jones | E04H 9/145 114/261 |
| 2017/0120990 A1* | 5/2017 | Paturu | B63B 23/30 |
| 2024/0018932 A1* | 1/2024 | Theurer | F03B 11/008 |

* cited by examiner

*Primary Examiner* — Michael R Neff
(74) *Attorney, Agent, or Firm* — Plumsea Law Group, LLC

(57) ABSTRACT

A communications system including a first unit having a first body configured to be securely fixed with respect to the ground; and a second unit having a second body configured to be removably physically attached against the first body of the first unit. The first unit is configured to be in electrical communication with the second unit when the second body of the second unit is physically attached against the first body of the first unit; and the second body of the second unit is configured to physically detach from the first body of the first unit when a surrounding water level reaches a predetermined elevation and float in the surrounding water proximate to the first unit.

18 Claims, 7 Drawing Sheets

COMMUNICATIONS SYSTEM FOR DISASTER CONDITIONS

TECHNICAL FIELD

The present disclosure generally relates to a communications system and, more particularly, a communication system configured for sustained operation during disaster conditions.

BACKGROUND

Various types of catastrophic events lead to disaster conditions that often result in a loss of operation for infrastructure such as electrical power and communications systems. The systems are disabled by numerous aspects of the catastrophic events, including, for example, flooding, winds, earthquake vibrations, etc. Communications are among the most significant aspects of disaster response and, therefore, communications systems are desired to be one of, if not, the first systems reestablished following the onset of disaster conditions. The sooner communications can be established following a catastrophe, the better, and thus, it is desirable to maintain some level of communication during a catastrophe and throughout the disaster conditions that follow.

The present disclosure addresses one or more of the issues discussed above.

SUMMARY

The disclosed invention generally relates to a system that provides emergency communications after a catastrophe. The system is designed to operate after significant infrastructure systems, such as electricity and communications, has been destroyed by the catastrophe.

Physically, the system is designed to run indefinitely without an external power supply. In order to do so, the system can include a large battery and a solar power array. Components of the system are also designed to survive catastrophic events. Accordingly, the device may be shock proof, waterproof, fire resistant, and buoyant. In some versions, the surviving device can be tethered (mechanically and electrically) to communications infrastructure, like an MSC (Mobile Switching Center) and receive power and exchange data prior to the catastrophic event. In some embodiments, the device can withstand flooding by automatically detaching mechanically from the MSC and floating like a buoy while remaining mechanically tethered to the MSC.

In operation, the surviving device may be designed to provide emergency communication services when all other forms of communications are unavailable due to the catastrophic event. The device can have a high power mode when the device is connected to the MSC prior to the catastrophe, and a low power mode that is implemented when power and communications are no longer available as a result of the catastrophe.

In one aspect, the present disclosure is directed to a communications system, comprising: a first unit having a first body configured to be securely fixed with respect to the ground; and a second unit having a second body configured to be removably physically attached against the first body of the first unit. The first unit is configured to be in electrical communication with the second unit when the second body of the second unit is physically attached against the first body of the first unit; and the second body of the second unit is configured to physically detach from the first body of the first unit when a surrounding water level reaches a predetermined elevation and float in the surrounding water proximate to the first unit.

In another aspect, the present disclosure is directed to a communications system, comprising: a first unit having a first body configured to be securely fixed with respect to the ground; and a second unit having a second body configured to be removably physically attached to the first unit. The first unit is configured to be in electrical communication with the second unit when the second body of the second unit is physically attached against the first body of the first unit; and the second body of the second unit is configured to physically detach from the first body of the first unit and electrically decouple from the first unit, while remaining mechanically tethered to the first unit. In addition, the second unit may include a controller comprising a device processor and a non-transitory computer readable medium having stored thereon instructions, executable by the processor, for performing the following functions: operating in a full power mode when the second unit is electrically coupled to, and powered by, the first unit; and operating in a low power mode when the second unit is electrically decoupled from the first unit.

In another aspect, the present disclosure is directed to a communications system including a first unit having a first body configured to be securely fixed with respect to the ground; and a second unit having a second body configured to be removably physically attached to the first unit. The first unit may be configured to be in electrical communication with the second unit when the second body of the second unit is physically attached against the first body of the first unit, and the second body of the second unit may be configured to detect a loss of electrical power from the first unit. In addition, the second unit may include a controller comprising a device processor and a non-transitory computer readable medium having stored thereon instructions, executable by the processor, for performing the following functions: determining whether disaster conditions are predicted in proximity to the system; and activating one or more modified modes of operation if a predicted duration of the disaster conditions exceeds a predetermined threshold.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The present disclosure is directed to a communications system, comprising a first unit having a first body configured to be securely fixed with respect to the ground, and a second unit having a second body configured to be removably physically attached against the first body of the first unit. The first unit may be configured to be in electrical communication with the second unit when the second body of the second unit is physically attached against the first body of the first unit. In addition, the second body of the second unit may be configured to physically detach from the first body of the first unit when a surrounding water level reaches a predetermined elevation and float in the surrounding water proximate to the first unit. Once the second unit is electrically decoupled from the first unit, the second unit may maintain a level of operation to facilitate current communications and/or future communications.

Figure 1:
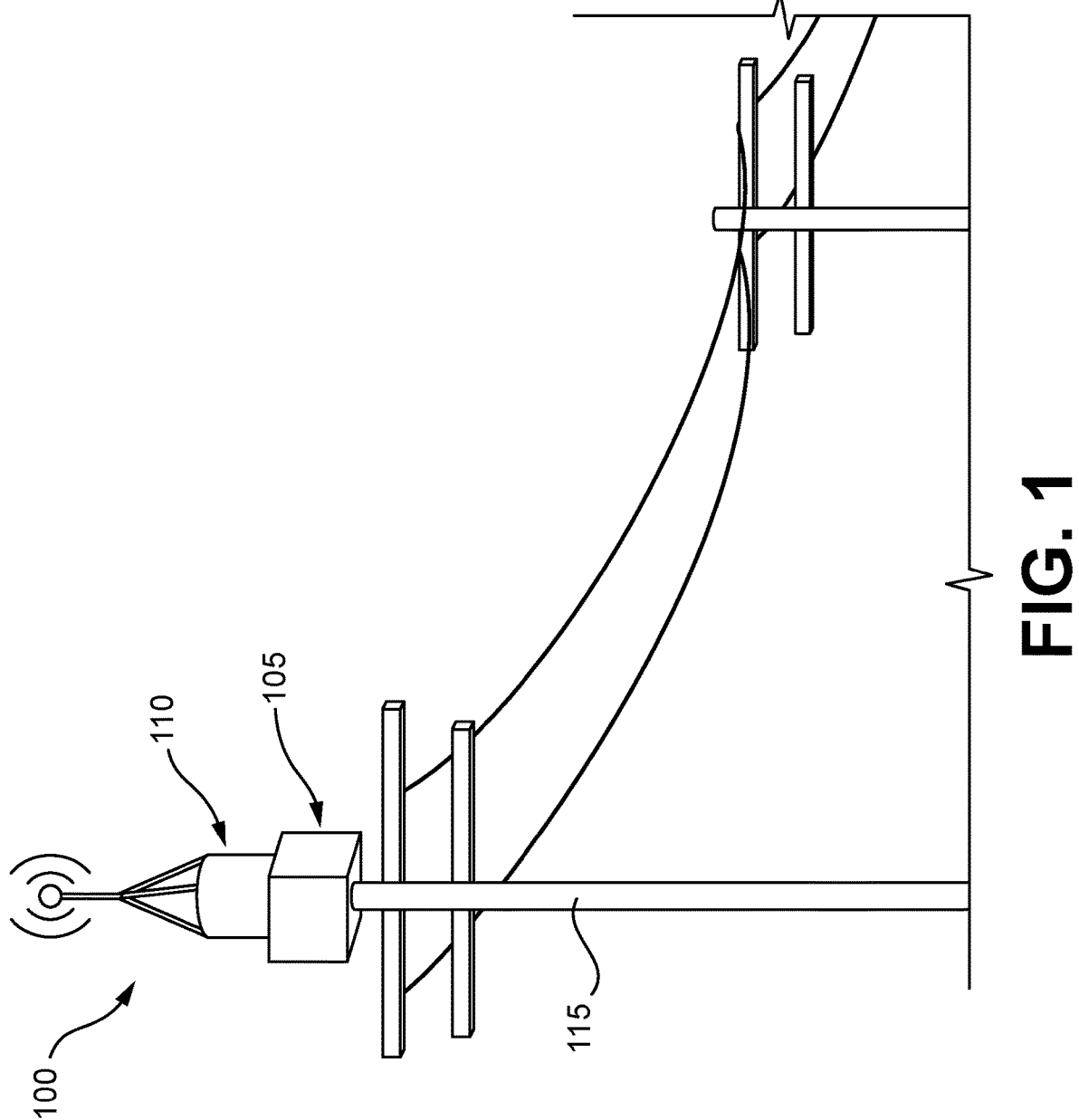
FIG. 1 is a schematic illustration of a communications system according to an exemplary embodiment.

FIG. 1 is a schematic illustration of a communications system according to an exemplary embodiment. As shown in FIG. 1, in some embodiments, a communications system 100 may be configured to be mounted in an elevated location, such as atop a utility pole. System 100 may include a first unit 105 and a second unit 110.

In some embodiments, first unit 105 may be a mobile switching center (MSC). Further, as shown in FIG. 1, first unit 105 may be configured to be mounted to the top of a utility pole 115. As also shown in FIG. 1, second unit 110 may be mounted atop first unit 105. In other embodiments, second unit 110 may be mounted to the side of first unit 105.

It will be understood that, although system 100 is shown in FIG. 1 atop a utility pole 115, in some cases, system 100 may be mounted in other elevated locations, such as a communications tower, a hill, a mountain, or any raised structure, custom-built or otherwise. The elevated mounting of system 100 may preserve maximum utility during all but the most extreme flooding. However, in some cases, system 100 may be mounted on land, for example, in the manner of a utility box (MSC) in a residential neighborhood.

Figure 2:
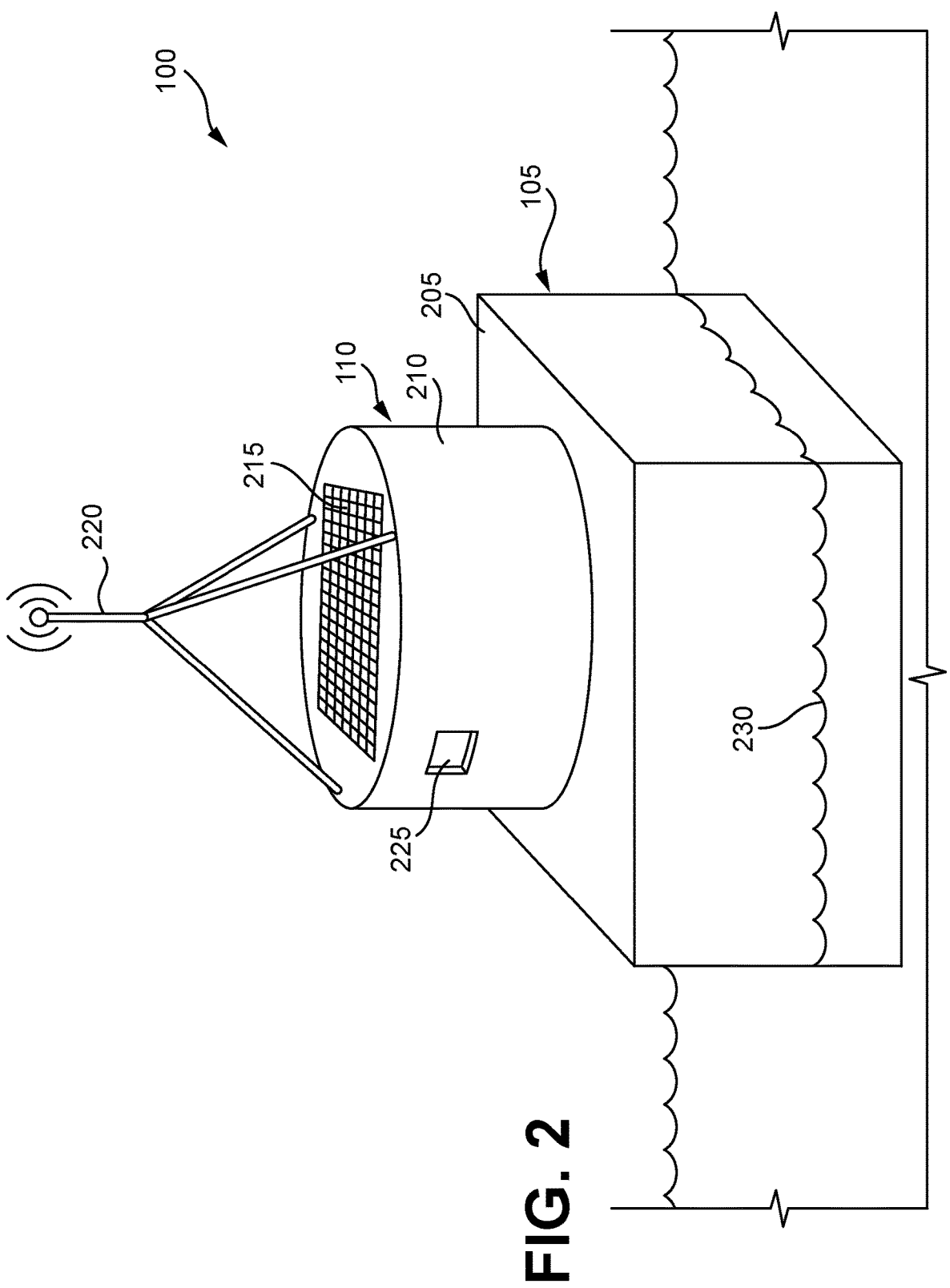
FIG. 2 is a schematic illustration of a communications system in pre-flood conditions.

FIG. 2 is a schematic illustration of a communications system in pre-flood conditions. As shown in FIG. 2, a water level 230 is creeping up first unit 105, but has not yet submerged first unit 105. As shown in FIG. 2, first unit 105 may include a first body 205 and second unit 110 may include a second body 210. First body 205 and second body 210 may each include a housing or shell and include, within the respective shell, electronics/communications componentry. In addition, first body 205 and second body 210 include physical, mechanical, and electrical connection elements configured for physical attachment, mechanical attachment, and electrical coupling between first body 205 and to second body 210.

As also shown in FIG. 2, second unit 110 may include at least one solar power cell configured to harvest energy in order to maintain operation of predetermined functions of second unit 110 when second unit 110 is electrically decoupled from first unit 105. For example, as shown in FIG. 2, second unit 110 may include a solar panel 215. Solar panel 215 is shown schematically and it will be understood that the configuration of solar panel 215 may be arranged suitably and that one of ordinary skill in the art would recognize exemplary configurations for such a solar panel. For example, in some embodiments, second unit 110 may include one or more solar power cells on a side of second body 210 in addition to (or as an alternative to) solar panel 215 atop second body 210.

As shown in FIG. 2, second unit 110 may include at least one antenna 220 for facilitating communications. It will be understood that antenna 220 is shown schematically and that those having ordinary skill in the art will readily recognize suitable configurations for antenna 220. It will be further understood that the number of antennae may vary and that second unit 110 may include more than one antenna.

As shown in FIG. 2, second unit 110 may include a flood sensor 225. It will be understood that flood sensor 225 is illustrated schematically and that those having ordinary skill in the art will readily recognize suitable implementations of a flood sensor. Also, although flood sensor 225 is shown as being integrated with second unit 110, in some embodiments, the flood sensor may be integrated with first unit 105. In some cases, both units may include flood sensors.

Figure 3:
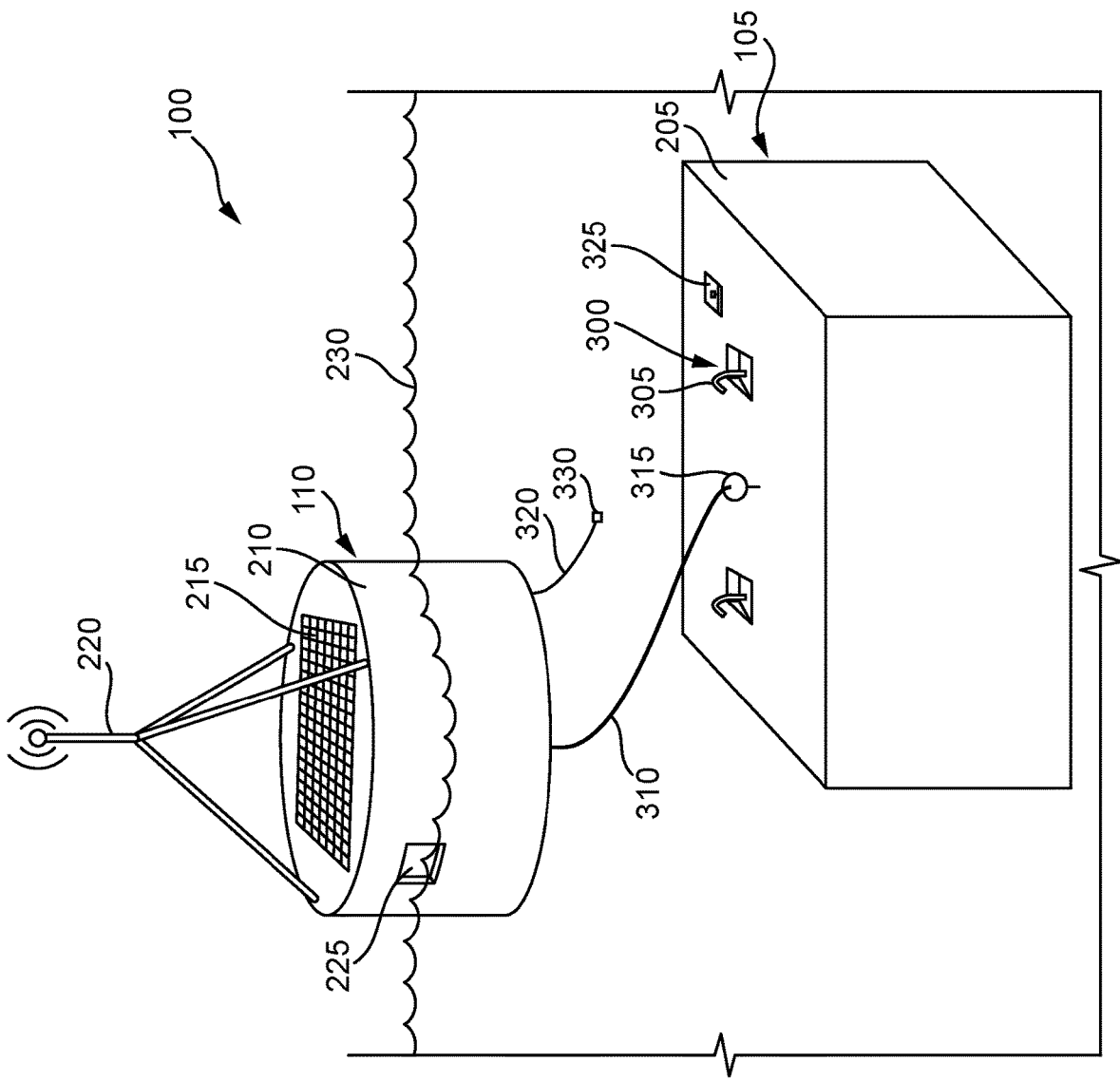
FIG. 3 is a schematic illustration of a communications system in flood conditions.

FIG. 3 is a schematic illustration of a communications system in flood conditions. As shown in FIG. 3, water level 230 is high enough to completely submerge first unit 105, and second unit 110 has now detached physically from first unit 105 and is floating in the water proximate to first unit 105.

At this point a distinction will be made between the terms "physical," "mechanical," and "electrical," as used in this specification and the following claims.

Second body 210 of second unit 110 may be removably physically attached to first body 205 of first unit 105. For example, as shown in FIG. 3, system 100 may include a physical attachment mechanism 300 configured to secure second body 210 of second unit 110 to first body 205 of first unit 105. As further shown in FIG. 3, physical attachment mechanism 300 may include one or more latches 305 (or other similar connection elements) configured to secure second body 210 to first body 205. For example, latches 305 may be located on a top surface of first unit 105 and configured to latch onto corresponding elements on a bottom surface of second unit 110. It will be understood that, although latches 305 are shown extending from first body 205 of first unit 105, in some cases, latches 305 may be extending from second body 210 of second unit 110. When referencing "physical" attachment and detachment, the present disclosure is referring to the engagement and disengagement of physical attachment mechanism 300.

When water level 230 gets to be high enough to be detected by flood sensor 225, system 100 may automatically activate physical attachment mechanism 300 to detach second body 210 of second unit 110 from first body 205 of first unit 105. This enables second unit 110 to float in the water, thereby staying above water and maintaining its ability to receive and/or send communications. FIG. 3 shows second unit 110 floating in the water proximate to first unit 105 after physically detaching from first body 205 of first unit 105.

Despite being "physically detached" from first body 205 of first unit 105, second body 210 of second unit 110 may remain "mechanically tethered" to first body 205 with mechanical tether 310. Mechanical tether 310 may be secured, at a first end, to an anchor 315 on first body 205 of first unit 105. In addition, mechanical tether 310 may be secured, at an opposite second end, to a similar anchor (not shown) on second body 210 of second unit 110. It will be understood that mechanical tether 310 and anchor 315 are shown schematically and that those having ordinary skill in the art would readily recognize suitable tethering equipment configured to maintain second unit 110 mechanically teth- ered to first unit 105 during a flood/storm. The length of the tether should be long enough that second unit 110 may reach considerably higher than first unit 105 in case flood waters far exceed the elevation of first unit 105. In addition, mechanical tether 315 should be selected of material having considerable strength, such as cable formed, for example, of steel. In some embodiments, such a cable may be formed of corrosion resistant or corrosion-proof material, such as stainless steel, titanium, or composite (e.g., synthetic) mate- rials. In some cases, mechanical tether 310 may be wound about a spool in either first unit 105 or second unit 110.

As shown in FIG. 3, second unit 110 may be in electrical communication with first unit 105. For example, in addition to the physical attachment and mechanical tether, second unit 110 may also be electrically coupled to first unit 105 via an electrical tether 320. In some embodiments, electrical tether may include a magnetic connector that readily decouples when second unit 110 physically detaches from first unit 105 and moves away from first unit 105. For example, the magnetic connector may include a first com- ponent 325 on first body 205 of first unit 105 and a second component 330 on second body 210 of second unit 205. First component 325 and second component 330 may be readily decoupled as second unit 110 pulls away from first unit 105. As such, second unit 110 may become self-contained elec- trically once the electrical tether is decoupled.

It will be understood that first component 325 and second component 330 are shown schematically and that those having ordinary skill in the art will readily recognize suit- able configurations for the electrical connection between first unit 105 and second unit 110. It will also be understood that, in some cases, electrical tether 320 may be long enough that second unit 110 may float with electrical tether 320 still electrically coupled to first unit 105. It will be further understood that the electrical connection may not utilize a tether at all. Instead, the second component may simply be a contact on the underside of second unit 110, which simply separates from first component 325 when second unit 110 floats away from first unit 105. Moreover, if the transmission of electrical power is lost between first unit 105 and second unit 110, second unit 110 may activate low power mode, even if the electrical coupling becomes decoupled. In this way, second unit 110 may have a backup source of power and provide backup communications in the event first unit 105 loses power and/or communications operation.

In order to maintain operation during a catastrophic event, second unit 110, and the components therein, may be particularly durable. In particular, second unit 110 may be not only water-proof and buoyant, but also vibration resis- tant and fire resistant. As such, second body 210 of second unit 110 may be formed of a suitable material having the characteristics listed above. Lightweight materials, such as aluminum, titanium, carbon fiber or other composites, high temperature plastics, etc. may be utilized for second body 210. Joints may be formed to be watertight.

Figure 4:
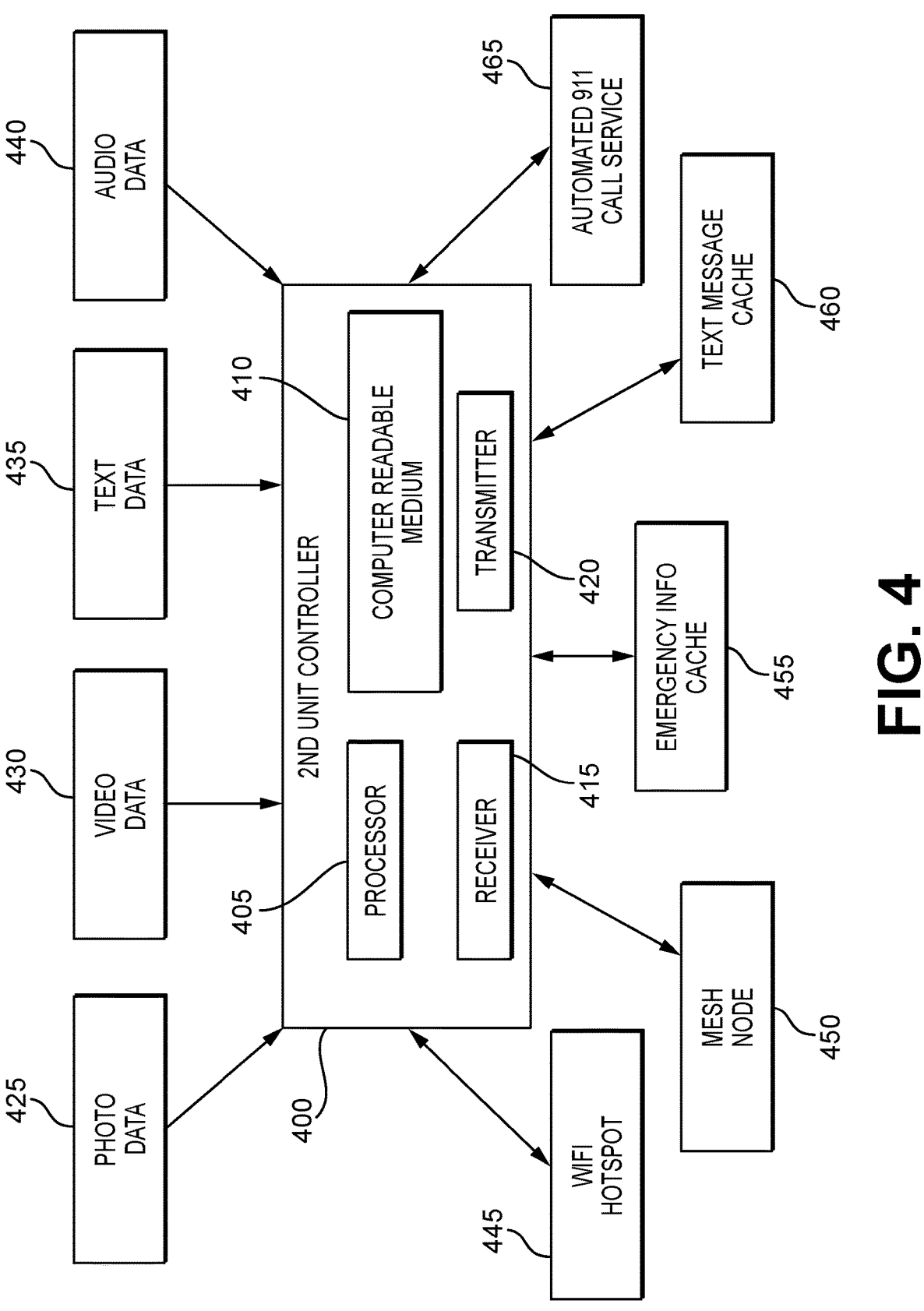
FIG. 4 is a schematic block diagram of components of a communications system.

FIG. 4 is a schematic block diagram of components of a communications system. In particular, FIG. 4 illustrates a second unit controller 400 along with its inputs and outputs. Second unit controller 400 may include various computing and communications hardware, such as servers, integrated circuits, displays, etc. Further, as shown in FIG. 4, second unit controller 400 may include a device processor 405 and a non-transitory computer readable medium 410 having stored thereon instructions, executable by processor 405, for performing the various functions discussed herein. For example, computer readable medium 410 may include instructions for operating in a full power mode when the second unit is electrically coupled to, and powered by, the first unit; and operating in a low power mode when the second unit is electrically decoupled from the first unit. When in low power mode, the second unit may be config- ured to conserve battery power and maximize run time, thus enabling the system to maintain some level of communica- tions support for the duration of a catastrophic event and during the initial stages of recovery until communications infrastructure may be re-established. Second unit controller 400 may be configured to implement various other modified communications functions when in low power mode. Such functions will be discussed in greater detail below.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer read- able medium for carrying out operations of the present invention may be instruction-set-architecture (ISA) instruc- tions, assembler instructions, machine instructions, machine dependent instructions, microcode, firmware instructions, configuration data for integrated circuitry, state-setting data, or source code or object code written in any of one or more programming languages, including an object oriented pro- gramming language such as Smalltalk, C++, or suitable language, and procedural programming languages, such as the "C" programming language or similar programming languages.

Aspects of the present disclosure are described in asso- ciation with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, function- ality, and operation of possible implementations of various disclosed embodiments. Accordingly, each block in the flowchart or block diagrams may represent a module, seg- ment, or portion of instructions. In some implementations, the functions set forth in the figures and claims may occur in an alternative order to that listed and/or illustrated.

Second unit controller 400 may include networking hardware configured to interface with other nodes of a network, such as a LAN, WLAN, or other networks. Further, controller 400 may be configured to receive data from a plurality of sources and communicate information to one or more external destinations. Accordingly, controller 400 may include a receiver 415 and a transmitter 420. (It will be appreciated that, in some embodiments, the receiver and transmitter may be combined in a transceiver.) In some cases, communications between components may be made via the Internet, a cellular network, Bluetooth, Wi-Fi, or other suitable communications network.

Any suitable communication platforms and/or protocols may be utilized for communication between controller 400 and other components of the system. Since the various sources of information may each have their own platform and/or protocol, the system may be configured to interface with each platform and/or protocol to receive the data.

Since second unit controller 400 collects data from various sources, as shown in FIG. 4, exemplary data collected by second unit controller 400 may include photo data 425, video data 430, text data 435, and/or audio data 440. This data may be received in the form of text messages, email, telephone calls and voicemails, etc.

As noted above, when the second unit is electrically coupled with the first unit, the second unit may operate in a high power mode, and when the second unit is electrically decoupled from the first unit, the second unit may activate a low power mode. When in high power mode, the second unit may be configured to collect and store rich data. That is, the second unit controller 400 may collect and store all data from a given message or communication. However, in contrast, in low power mode, second unit controller 400 may be configured to restrict the storage of certain types of data. For example, in low power mode, the second unit may be configured to prevent or block the storage of video and photographic data, while allowing the storage of text and audio data. By restricting storage and transmission of memory-heavy data, such as video and photographic data, the system may be able to conserve storage space.

In low power mode, the second unit may provide one or more emergency communications functions. For example, as shown in FIG. 4, second unit controller 400 may regulate equipment within the second unit such that the second unit can serve as a Wi-Fi hotspot (445) or micro cell tower and facilitate communications between one or more users in proximity to the system and one or more parties remote from the system location. For example, the system may facilitate communications between persons stranded in a disaster area and parties outside the disaster area.

Alternatively, or additionally, when in low power mode, second unit controller 400 may regulate equipment within the second unit such that the second unit can serve as a mesh node (450) and connect to nearby emergency communications devices or satellites to act as a bridge or gateway between one or more users in proximity to the system and one or more parties remote from the system location. For example, in some embodiments, the second unit may be one of many such units that may form a mesh network. Such units may communicate with one another and facilitate communications between those in a disaster area and those outside the disaster area.

As also shown in FIG. 4, second unit controller 400 may regulate equipment within the second unit such that the second unit can serve as an emergency info cache (455). For example, the second unit may regularly collect the latest emergency information (e.g., contact information for fire and rescue and/or other first responders, the locations of buildings to be used as shelters, etc.). This latest emergency information may be stored in emergency info cache 455 and available/accessible to local users when the system is in low power mode.

As also shown in FIG. 4, second unit controller 400 may regulate equipment within the second unit such that the second unit can serve as a text message cache (460). For example, the second unit may be configured to receive text messages from local users and store the messages in a cache to be sent once an external connection with one or more parties remote from the location of the system is restored.

As also shown in FIG. 4, second unit controller 400 may regulate equipment within the second unit such that the second unit can serve as an automated emergency call service (465). For example, upon dialing "911" or another predesignated number, users may be routed to automated emergency call service 465 provided by the second unit when in low power mode.

Figure 5:
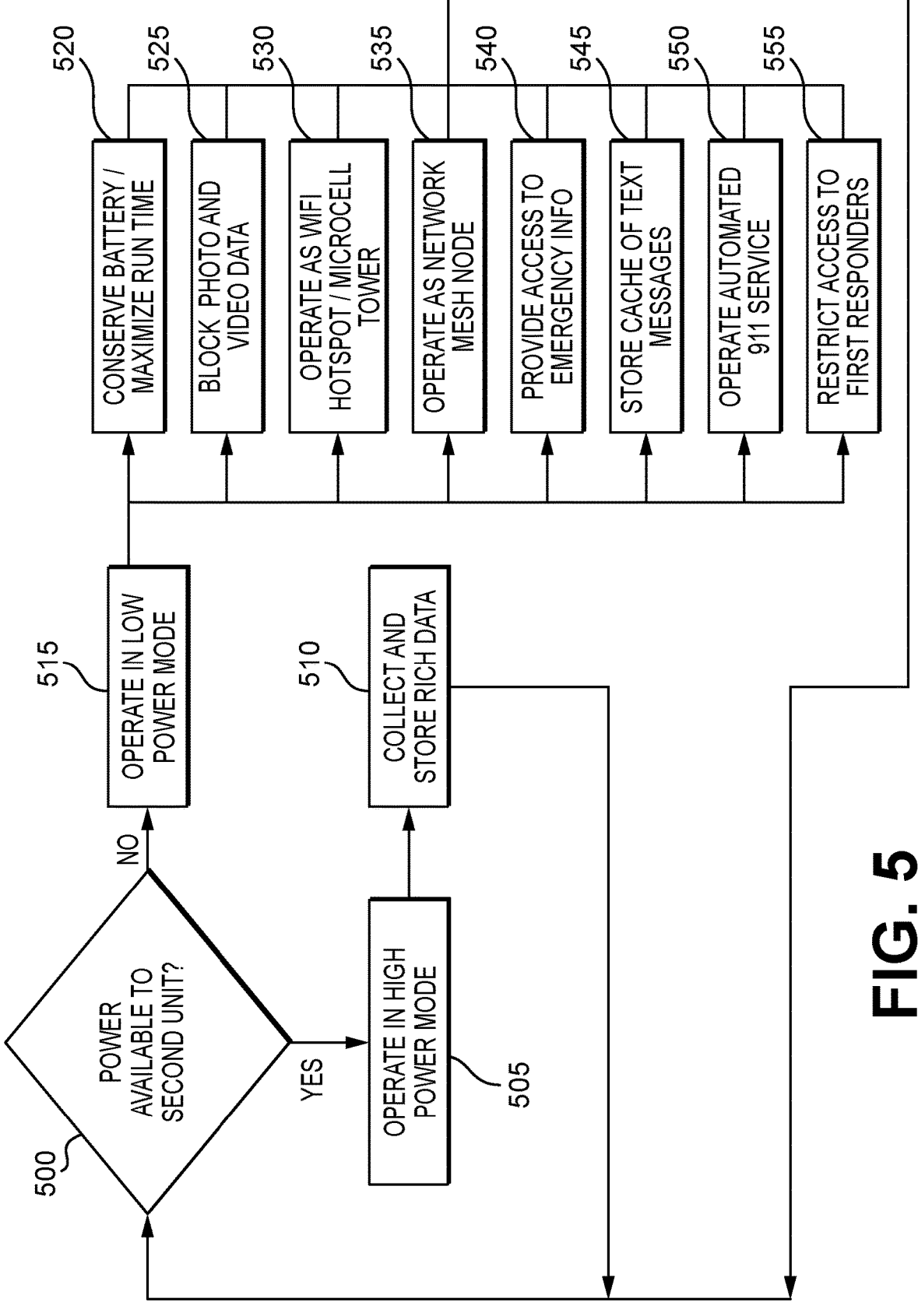
FIG. 5 is a flow chart illustrating a method of operating a communications system involving the activation of a low power mode.

FIG. 5 is a flow chart illustrating a method of operating a communications system. FIG. 5 illustrates some of the functions implemented when low power mode is activated. As shown in FIG. 5, at step 500, the system detects whether the second unit is being supplied with electrical power from the first unit. If so, the system continues to operate in high power mode (step 505) and the system collects and stores rich data (step 510). As further shown in FIG. 5, the system continues to loop back to step 500 and continually assess whether the electrical tether is coupled.

If and when it is determined (at step 500) that electrical power is NOT being provided by the first unit, then the method proceeds to step 515, and low power mode is activated. It will be understood that, in some embodiments, low power mode may be activated automatically. When low power mode is activated, a number of functions may become operational. For example, as discussed above, in low power mode, the system may operate to conserve battery and maximize run time (step 520).

Further, at step 525, the system may block the transmission and/or storage of photo and video data. This may conserve storage, which may be limited on board the second unit. In addition, this may preserve bandwidth so as to maintain sufficient bandwidth available for emergency communications.

Also, at step 530, the system may operate as a Wi-Fi hotspot or microcell tower. In addition, the system may operate as a network mesh node (step 535). At step 540, the system may provide access to emergency information. At step 545, the system may store a cache of text messages for delivery once mainline communications are re-established. At step 550, the system may operate an automated emergency call service.

In addition, in order to maintain emergency channels of communication, access to the functions of the system may be prioritized or even restricted to first responders. For example, as shown in FIG. 5, when in low power mode, the second unit may be configured to restrict access to first responders (step 555). This may ensure that there is enough bandwidth and/or storage available for first responders to utilize the communications features of the system when the second unit is in low power mode.

It will be understood that, not all of the functions of low power mode may occur automatically.

Figure 6:
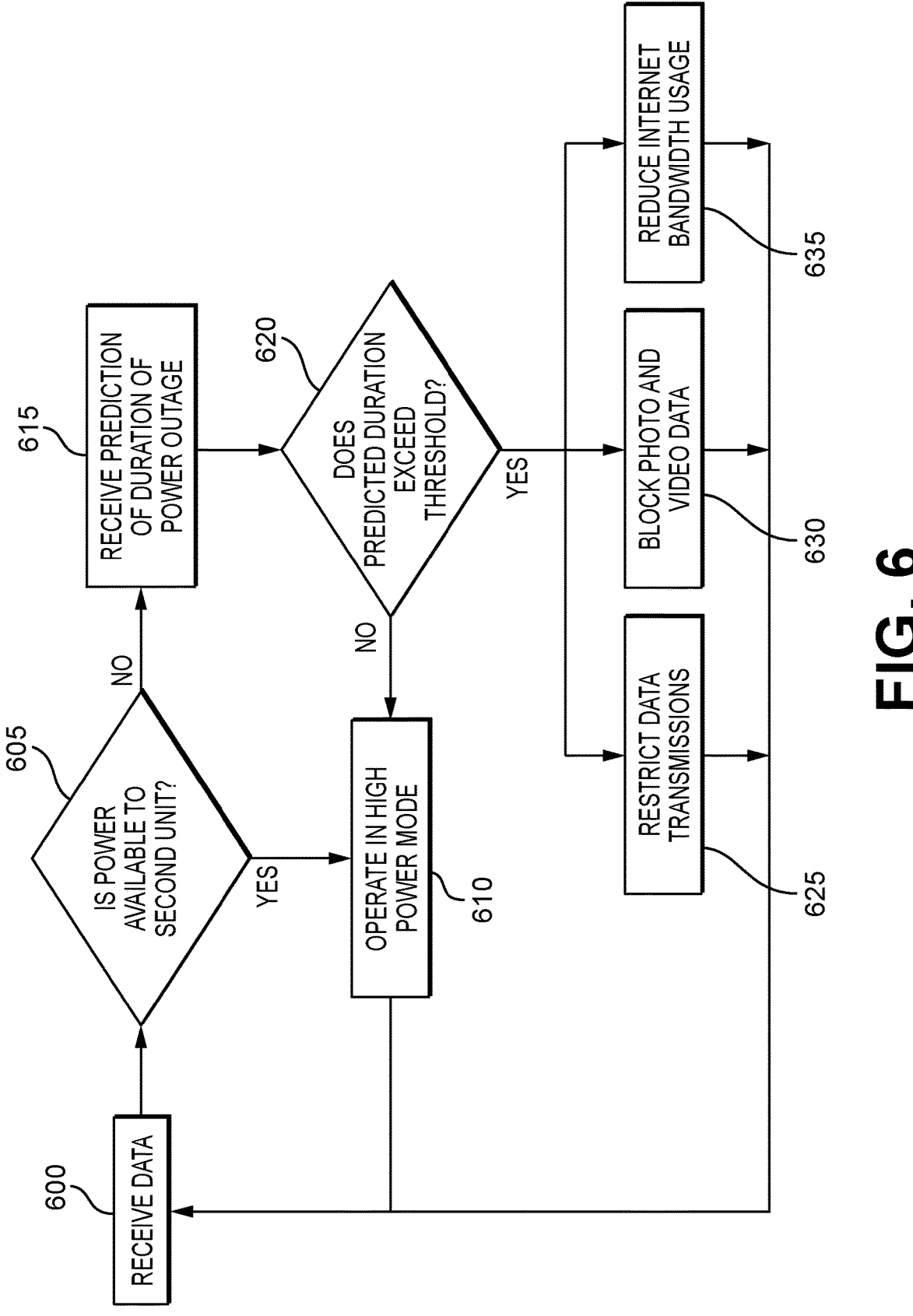
FIG. 6 is a flow chart illustrating a method of operating the system involving the conservation of battery capacity.

FIG. 6 is a flow chart illustrating a method of operating the system involving the conservation of battery capacity. As shown in FIG. 6, the system may receive data from various sources (step 600) as described previously. For example, the system may receive communications, like text messages, voicemails, emails, radio transmissions, etc. In addition, the system may receive data regarding emergency information, as well as weather data, and other information relevant for communications and/or emergency situations.

As also discussed above, the system may be configured to assess whether power is available to the second unit (step 605). If so, the system continues to operate in high power mode (610) or otherwise remains in regular operation. If power is NOT available to the second unit, then the system may implement one or more modified modes of operation. In some embodiments, a further determination may be made as to how long the power outage may last before entering a modified mode of operation. As shown in FIG. 6, at step 615, the system may receive information about a predicted duration of a power outage. At step 620, the system assesses whether the predicted duration of the outage exceeds a predetermined threshold? For example, if the power outage is predicted to last more than 24 hours, the system may enter a modified mode of operation.

As shown in FIG. 6, several measures may be taken to conserve battery usage. For example, data transmissions may be restricted (step 625). Messages may be collected, but not transmitted yet. In some embodiments, in this restricted mode of operation, the system may wait until an external power supply is restored before transmitting the collected messages.

As also shown in FIG. 6, the handling of photo and video data may be blocked (step 630). For example, the transmission and/or storage of photos and videos may be blocked in order to limit the amount of data being processed, and thus conserve battery usage as well as storage space.

As further shown in FIG. 6, the system may reduce the amount of internet bandwidth being used (step 635). Various data transmission restrictions may be implemented to minimize battery use.

It will also be understood that these functions could be triggered by other conditions besides a loss of power to the second unit from the first unit. For example, in some embodiments, the system may automatically determine whether disaster conditions exist or are predicted. In some cases, this determination may be made based on data received, such as forecast data. In other cases, the system may include various sensors to collect its own data. For example, the system may include vibration sensors to detect whether there is an earthquake. If the vibration sensor detects vibrations above a certain threshold severity, then the system may activate one or more of the functions discussed above as being associated with low power mode. Similarly, the flood sensor may also be utilized in this manner. That is, irrespective of whether the unit becomes physically detached or electrically decoupled, if the flood sensor detects flooding, the system may activate one or more of the functions discussed above as being associated with low power mode.

Figure 7:
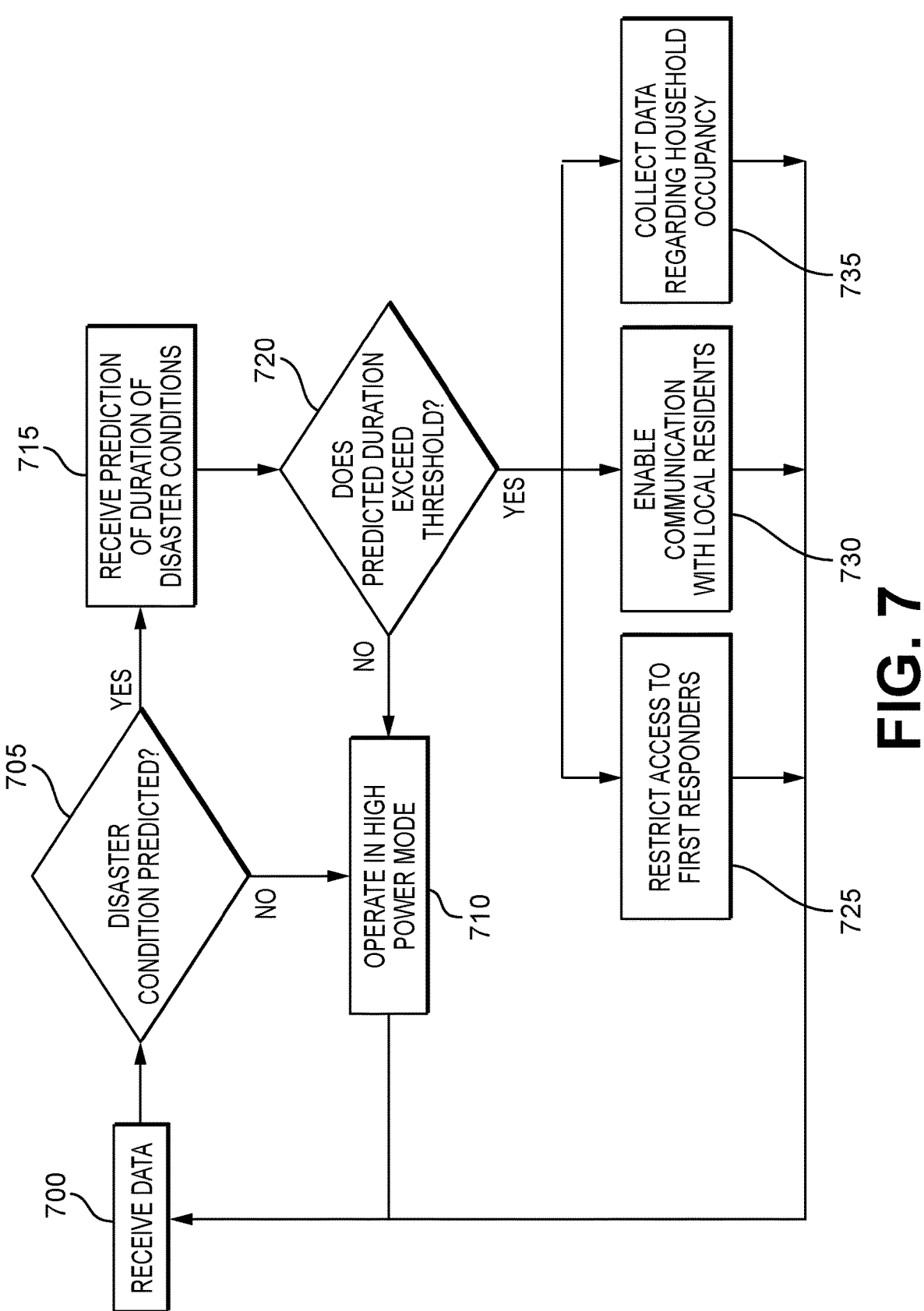
FIG. 7 is a flow chart illustrating a method of operation the system involving the utilization of the system by first responders.

FIG. 7 is a flow chart illustrating a method of operation the system involving the utilization of the system by first responders. As discussed above, various types of data may be received by the system (step 700). As shown in FIG. 7, a determination may be made as to whether a disaster condition is predicted (step 705). For example, the system may determine whether a flood is predicted. It will be noted that, in some cases, the system may be configured to determine whether a disaster condition is already in existence. For example, as discussed above, the system may determine whether flood conditions exist.

As also shown in FIG. 7, if no disaster condition is predicted, then the system may continue to operate in high power (regular) mode (step 710). If, on the other hand, a disaster condition is predicted, the system may make a determination as to how bad the disaster will be and/or how long the disaster conditions may last. For example, as shown in FIG. 7, the system may receive forecast information including a prediction as to the expected duration of the disaster conditions (step 715). For example, the system may receive information about the anticipated duration of flooding, power outage, etc. It will be understood that the prediction of disaster conditions and the prediction of how long the conditions will last may be made offboard, for example, by a weather service. In some embodiments, however, the system may be configured to make its own determinations based on certain data. For example, as discussed above, the system may measure vibrations and assess whether an earthquake has occurred. Based on the severity of the earthquake, the system may predict flooding as well as an expected duration of the flooding. Other disaster conditions may be monitored and predictions made based on the collected data.

As shown in FIG. 7, at step 720, the system may determine whether the predicted duration of the disaster conditions exceeds a predetermined threshold such that a modified mode of operation should be activated. For example, if the flooding is predicted to last more than 24 hours, a modified mode of operation should be activated.

Exemplary modifications to the operation of the system may be made to facilitate usage by first responders. For example, as shown in FIG. 7, access to the communications features of the second unit may be restricted to first responders (step 725). In some embodiments, first responders may be provided with prioritized usage. In other embodiments, usage of the second unit may be limited to first responders only.

As also shown in FIG. 7, in some embodiments, the system may be configured to enable communication between first responders and local residents (step 730). For example, when conventional channels of communication are disabled, a dedicated communication system may be provided so that first responders can communicated with residents in proximity to the system.

Another features that may facilitate the duties of first responders is that the system may be configured to collect data regarding household occupancy in proximity to the system (step 735). The data may also be associated with building structures, e.g., on a house-by-house basis so that first responders know which homes the stranded people are in.

For example, the system may receive distress messages and/or emergency (911) phone calls from local residents or otherwise collect data regarding persons in the area (e.g., how many cell phones are detected in the area). In some cases, the system may receive voicemails and transcribe the messages. For example, the voicemail prompt may ask the callers for specific information, e.g., what is the address where you are located, how many people are there with you, how many pets, is anyone sick, disabled, or otherwise have any particular medical needs, etc. This information may enable first responders to prioritize homes, businesses, or general geographic areas where the system has identified people to be.

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A communications system, comprising:
a first unit having a first body configured to be fixed with respect to the ground; and
a second unit having a second body configured to be removably physically attached against the first body of the first unit;
wherein the first unit is configured to be in electrical communication with the second unit when the second body of the second unit is physically attached against the first body of the first unit; and
wherein the second body of the second unit is configured to physically detach from the first body of the first unit when a surrounding water level reaches a predetermined elevation and float in the water surrounding the first unit;
wherein the electrical communication is provided by an electrical tether; and
wherein the electrical tether includes a magnetic connector that readily decouples when the second unit physically detaches from the first unit and moves away from the first unit.

2. The system of claim 1, further including a mechanical tether extending between the first unit and the second unit such that the second unit floats in proximity to the first unit when the second body of the second unit is physically detached from the second body of the first unit.

3. The system of claim 1, wherein the first unit is a mobile switching center (MSC).

4. The system of claim 1, wherein the first unit is configured to be mounted to the top of a utility pole.

5. The system of claim 1, wherein the second unit includes at least one solar power cell configured to harvest energy in order to maintain operation of predetermined functions of the second unit when the second unit is electrically decoupled from the first unit.

6. The system of claim 1, wherein the second unit is at least one of vibration resistant and fire resistant.

7. A communications system, comprising:
a first unit having a first body configured to be fixed with respect to the ground; and
a second unit having a second body configured to be removably physically attached to the first unit;
wherein the first unit is configured to be in electrical communication with the second unit when the second body of the second unit is physically attached against the first body of the first unit; and
wherein the second body of the second unit is configured to physically detach from the first body of the first unit and electrically decouple from the first unit, while remaining mechanically tethered to the first unit;
the second unit including a controller comprising a device processor and a non-transitory computer readable medium having stored thereon instructions, executable by the processor, for performing the following functions:
operating in a full power mode when the second unit is electrically coupled to, and powered by, the first unit; and
operating in a low power mode when the second unit is electrically decoupled from the first unit.

8. The system of claim 7, wherein, when in high power mode, the second unit is configured to collect and store rich data.

9. The system of claim 7, wherein, when in low power mode, the second unit is configured to conserve battery power and maximize run time.

10. The system of claim 7, wherein, when in low power mode, the second unit is configured to prevent or block the handling of video and photographic data, while allowing the handling of text and audio data.

11. The system of claim 7, wherein, when in low power mode, the second unit is configured to act as a Wi-Fi hotspot or micro cell tower and facilitate communications between one or more users within communication range with the system and one or more parties outside of communication range with the system location.

12. The system of claim 7, wherein, when in low power mode, the second unit is configured to act as a mesh node and connect to nearby emergency communications devices or satellites to act as a bridge or gateway between one or more users within communication range with the system and one or more parties outside of communication range with the system location.

13. The system of claim 7, wherein the second unit is configured to store updated emergency information to be accessed once the second unit electrically decouples from the first unit.

14. The system of claim 7, wherein the second unit is configured to receive text messages from local users and store the messages in a cache to be sent once an external connection with one or more parties outside of communication range with the location of the system is restored.

15. The system of claim 7, wherein the second unit is configured to provide an automated emergency call service.

16. The system of claim 7, wherein the second unit is configured to restrict access to system communications to first responder personnel.

17. A communications system, comprising:
a first unit having a first body configured to be fixed with respect to the ground; and
a second unit having a second body configured to be removably physically attached to the first unit;
wherein the first unit is configured to be in electrical communication with the second unit when the second body of the second unit is physically attached against the first body of the first unit; and
wherein the second body of the second unit is configured to detect a loss of electrical power from the first unit;
the second unit including a controller comprising a device processor and a non-transitory computer readable medium having stored thereon instructions, executable by the processor, for performing the following functions:

determining whether disaster conditions are predicted in proximity to the system; and activating one or more modified modes of operation of the second unit if a predicted duration of the disaster conditions exceeds a predetermined threshold.

18. The system of claim 17, wherein activating one or more modified modes of operation of the second unit includes one of the following:

restricting data transmissions;

blocking photo and video data;

reducing internet bandwidth;

restricting access to first responders;

providing a dedicated system of communication between first responders and persons within communication range of the system; and collecting data regarding household occupancy within communication range of the system.

* * * * *